US010214228B2

(12) United States Patent
Benton et al.

(10) Patent No.: US 10,214,228 B2
(45) Date of Patent: Feb. 26, 2019

(54) HAND TRUCK FOR MOVING WATER HEATERS AND TOILETS

(71) Applicant: Phoenix Inventors, LLC, St. George, UT (US)

(72) Inventors: Carl Benton, St. George, UT (US); Jon Petty, St. George, UT (US)

(73) Assignee: Pheonix Inventors, LLC, St. George, UT (US)

( * ) Notice: Subject to any disclaimer, the term of this patent is extended or adjusted under 35 U.S.C. 154(b) by 0 days.

(21) Appl. No.: 15/912,493

(22) Filed: Mar. 5, 2018

(65) Prior Publication Data

US 2018/0251143 A1 Sep. 6, 2018

Related U.S. Application Data

(60) Provisional application No. 62/466,447, filed on Mar. 3, 2017.

(51) Int. Cl.
*B62B 1/14* (2006.01)
*B62B 1/26* (2006.01)
*B62B 1/00* (2006.01)

(52) U.S. Cl.
CPC ............... *B62B 1/14* (2013.01); *B62B 1/002* (2013.01); *B62B 1/264* (2013.01); *B62B 2202/80* (2013.01)

(58) Field of Classification Search
CPC .... B62B 1/12; B62B 1/14; B62B 1/00; B62B 3/00; B66D 3/00
See application file for complete search history.

(56) References Cited

U.S. PATENT DOCUMENTS

| | | | | |
|---|---|---|---|---|
| 4,458,785 A | * | 7/1984 | Bushnell, Jr. ............. | B66F 9/08 182/145 |
| 4,987,976 A | * | 1/1991 | Daugherty ................ | B66B 9/16 16/331 |
| 5,078,364 A | * | 1/1992 | Harrell ...................... | B66F 9/08 254/387 |
| 5,123,666 A | * | 6/1992 | Moore ...................... | B62B 1/14 280/47.18 |
| 5,584,363 A | * | 12/1996 | Curtin ....................... | B66B 9/16 187/232 |
| 6,561,367 B2 | * | 5/2003 | Eaton ...................... | B66C 23/48 212/202 |
| 2012/0145978 A1 | * | 6/2012 | Rich ..................... | B62B 3/0606 254/2 R |

* cited by examiner

*Primary Examiner* — James A Shriver, II
*Assistant Examiner* — James J Triggs
(74) *Attorney, Agent, or Firm* — Gurr Brande & Spendlove, PLLC; Robert A. Gurr (57) ABSTRACT

A hand truck for moving water heaters and toilets has a fixed frame with one or more fulcrum wheels on a rear side, at least one floor stabilizing arm coupled to and extending from a front side, at least one outrigger support beam extending from the rear of the fixed frame, the at least one outrigger support beam further comprising a wheel at a distal end; and an extendable frame having a vertical beam, a horizontal beam coupled to the top of the vertical beam, and at least one lifting arm extending perpendicularly to the horizontal beam; the extendable frame vertically adjustable in relation to the fixed frame.

7 Claims, 10 Drawing Sheets

Fig. 10

HAND TRUCK FOR MOVING WATER HEATERS AND TOILETS

CROSS-REFERENCE TO RELATED APPLICATIONS

This application claims the benefit of U.S. Provisional Application Ser. No. 62/466,447 filed on Mar. 3, 2017, which is incorporated herein by reference.

TECHNICAL FIELD

The present disclosure relates to water heaters, toilets, and methods of moving the same. More particularly, the present disclosure relates to a hand truck having lifting arms used to raise and lower the water heater or toilet.

BACKGROUND

Hand trucks (also referred to herein as a "dolly" or "dollies"), have been used to move heavy objects for a very long time. There are generally two types of standard dollies: 1) an L-shaped lever with two wheels at the fulcrum; and 2) a 4-wheeled dolly that is usually a rectangular base with 4 wheels, but may also have one or more handles extending therefrom.

Specialized dollies have been invented for the purpose of moving bulky and especially heavy items such as fridges, washing machines, filing cabinets, water heaters, and others. For example, these appliance dollies typically have straps for securing the item to be moved, a pair of rotating belts for use with stairs, and may even have an additional leg extension for easing the weight being balanced by the user. However, all of these dollies require a user to physically lift the item to be moved by using the handles of the dolly like a lever. This may be difficult for one user to accomplish, and impossible in many scenarios. For example, water heaters are often elevated on a platform when installed in a house. This can make installation and removal difficult, especially considering that the average water heater weighs around 150 pounds. In such a scenario, one or more users must attempt to physically lift the water heater, which is awkward, difficult, and dangerous. Therefore, there remains a need for an apparatus that can raise, lower, and move a water heater without requiring more than one person, and that reduces the risk to a user.

Similar problems exist when trying to move western toilets. Often in confined spaces where only a single user may maneuver them, moving a toilet creates high risks of injury to that user, who must attempt to lift and move the toilet without assistance. Therefore, there is a need for an apparatus that can safely, and efficiently, move a western toilet.

Accordingly, the present invention seeks to solve these and other problems.

SUMMARY OF EXAMPLE EMBODIMENTS

In one embodiment, a hand truck for a water heater or toilet comprises a fixed frame, an extendable frame vertically adjustable in relation to the fixed frame, a pair of fulcrum wheels attached at the base of the fixed frame, a pair of lifting arms coupled to the top of the extendable frame and extending perpendicular to the fixed and extendable frames, and a hand crank or jack system for raising and lowering the extendable frame.

In one embodiment, a method of moving a water heater comprises using a hand truck having a means for coupling to the top of the water heater and a means for raising and lowering the water heater. In one embodiment, the means for lifting the water heater comprises a pair of lifting arms.

In one embodiment, a method of moving a toilet comprises using a hand truck having a means for coupling to the top of the toilet and a means for raising and lowering the toilet. In one embodiment, the means for lifting the toilet comprises a pair of lifting arms.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or"

denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

In one embodiment, as shown generally in FIGS. 1-8, a hand truck 100 for coupling to a water heater 102 comprises a fixed frame 104, an extendable frame 106 vertically extendable in relation to the fixed frame 104, a pair of fulcrum wheels 108 attached at the base of the fixed frame 104, one or more lifting arms 110 coupled to the top of the extendable frame 106 and extending perpendicular to the fixed and extendable frames 104, 106 respectively, and a method for raising and lowering the extendable frame 106. The hand truck further comprises at least one floor stabilizing arm 112, the floor stabilizing arm further comprising a wheel 113 at a distal end, the floor stabilizing arm 112 coupled to, and extending from, a front side of the fixed frame 104, and at least one outrigger support beam 114 extending from the rear of the fixed frame 104, the at least one outrigger support beam 114 further comprising a wheel 116 at a distal end. In a configuration with a plurality of outrigger support beams, a horizontal cross-member 118 may provide additional support and structural integrity. A strut 120 is interposed between the fixed frame 104 and floor stabilizing arms 112, aiding the fixed frame 104 to remain vertical when weight is overhanging the floor stabilizing arms 112. The extendable frame comprises a vertical beam 122 having a horizontal beam 124 mounted on the top thereof. While only one vertical beam 122 is shown, it will be appreciated that multiple vertical beams may be used. For example, the fixed frame 104 may be configured to receive vertical extension beams at its outer frames. The one or more lifting arms 110 are coupled to the horizontal beam 124. As shown in the Figs., the lifting arms 110 may pass through the horizontal beam 124, being secured therein using threaded couplers 126 or an equivalent means. This configuration allows for the lifting arms 110 to be easily adjusted horizontally when required. For example, a user may loosen the threaded couplers 126, horizontally adjust the location of the lifting arms 110, then tighten the threaded couplers 126, which secures the lifting arms 110 in position. However, other configurations are possible. For example, the lifting arms may be secured to the horizontal beam 124 using bolts, screws, cotter pins, or any number of configurations. Likewise, the lifting arms 110 may be extendable and/or capable of swiveling so as to allow for a variety of connections with a water heater 102. While the lifting arms 110 may be extendable and/or removable, this is not required. In other words, the lifting arms 110 may be welded to the horizontal beam 124 of extendable frame 106.

Figure 1:
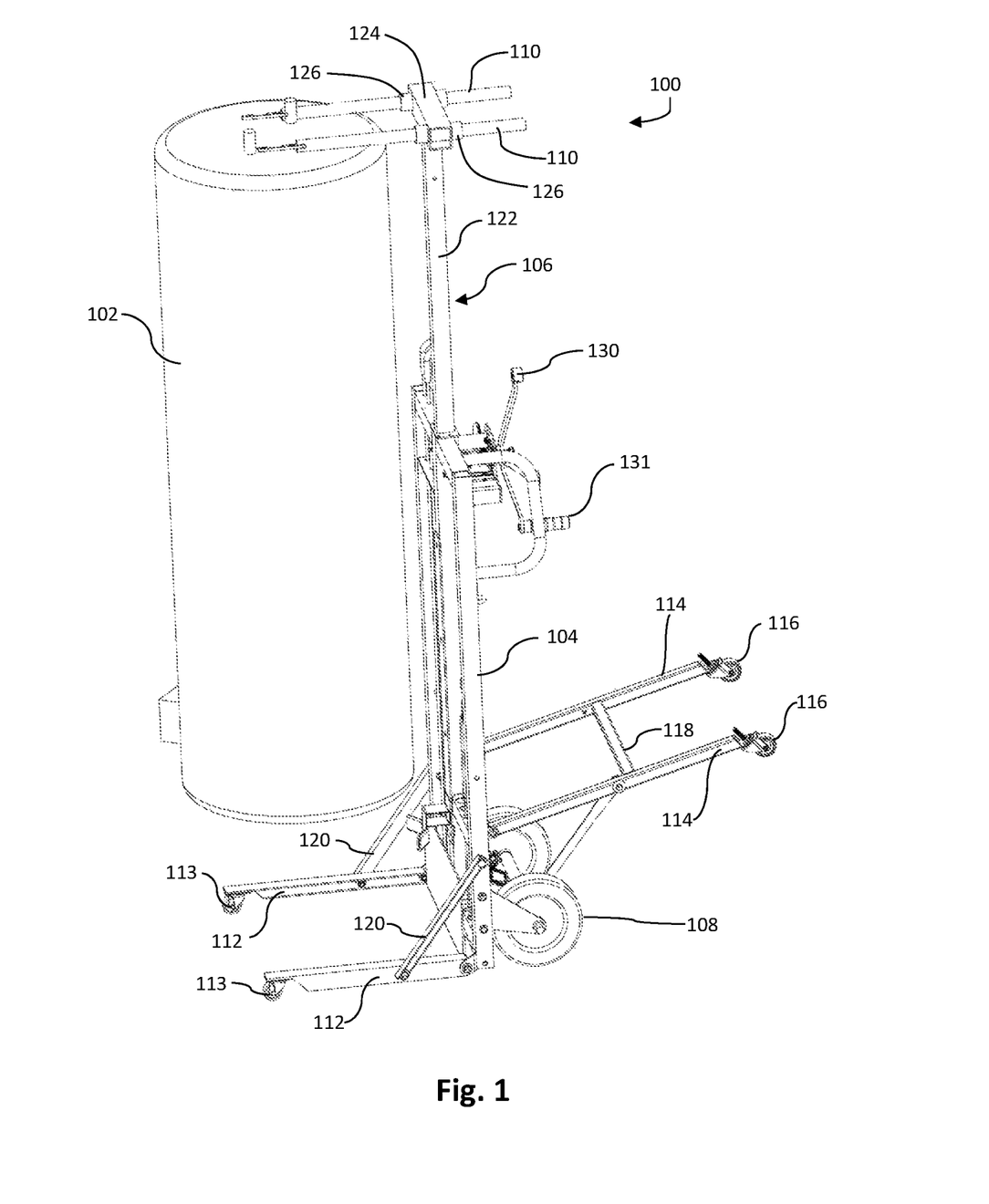
FIG. 1 is a perspective view of a hand truck coupled to a water heater.
Figure 2:
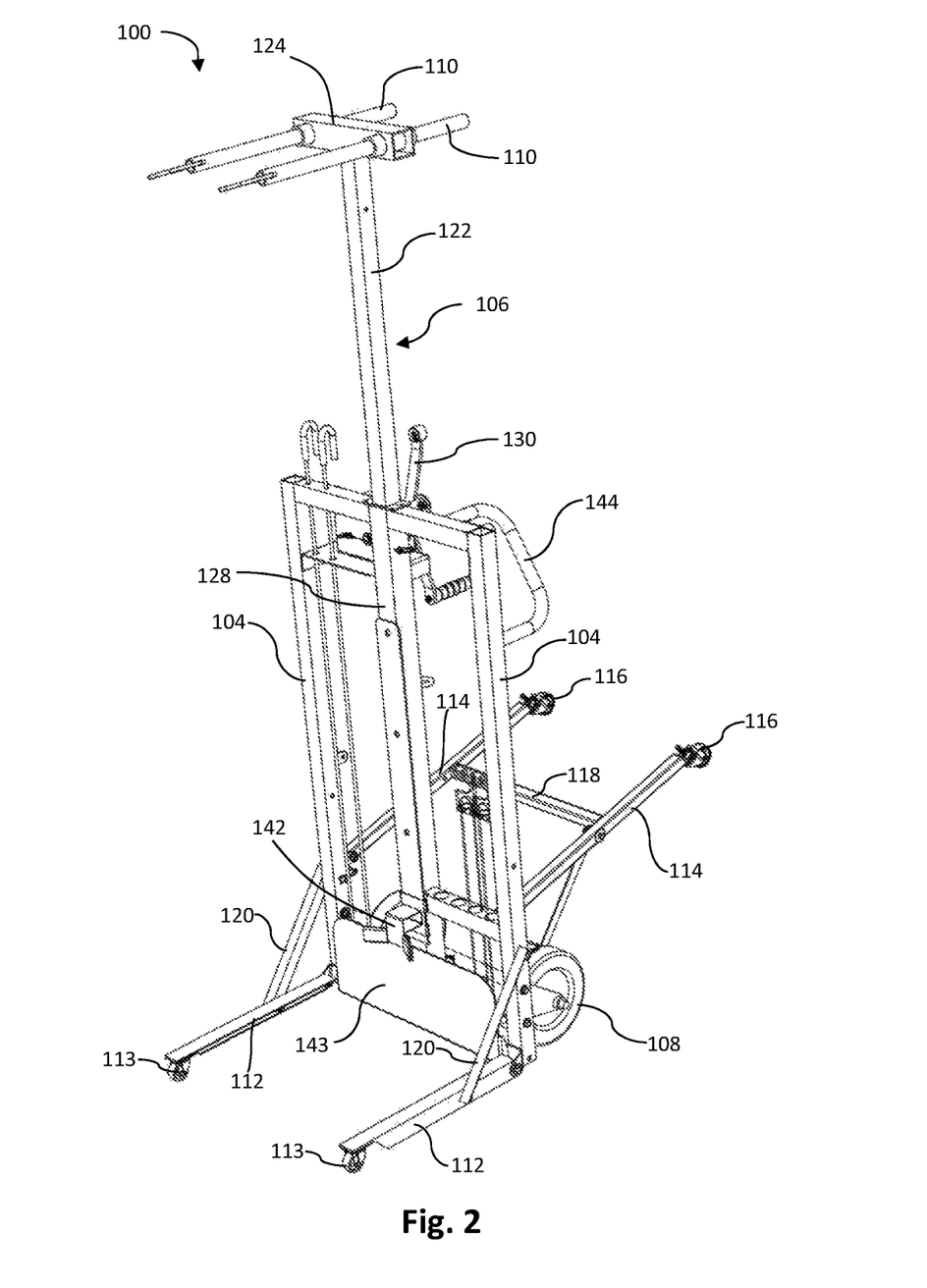
FIG. 2 front perspective view of a hand truck.
Figure 3:
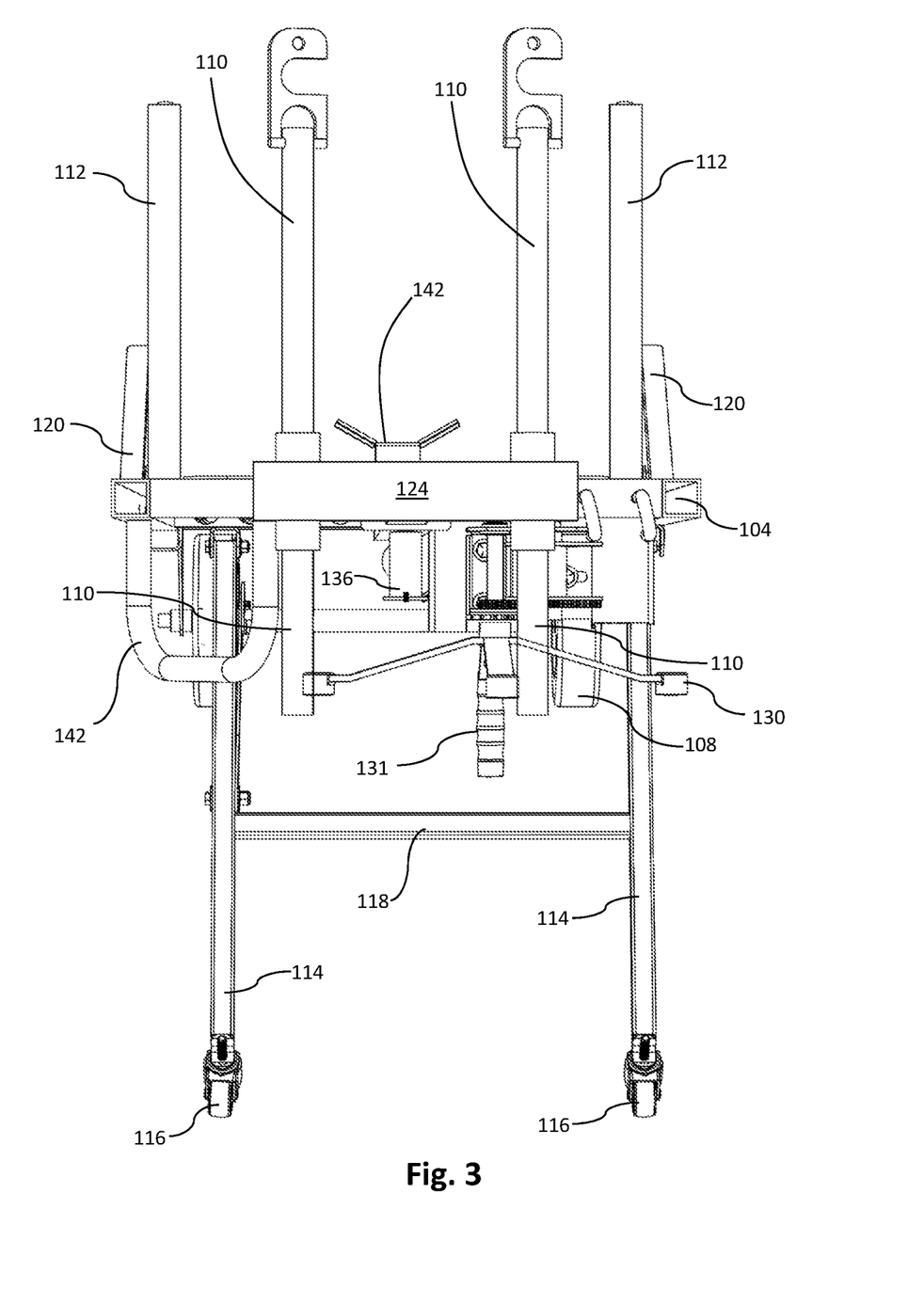
FIG. 3 is a top plan view of a hand truck.
Figure 4:
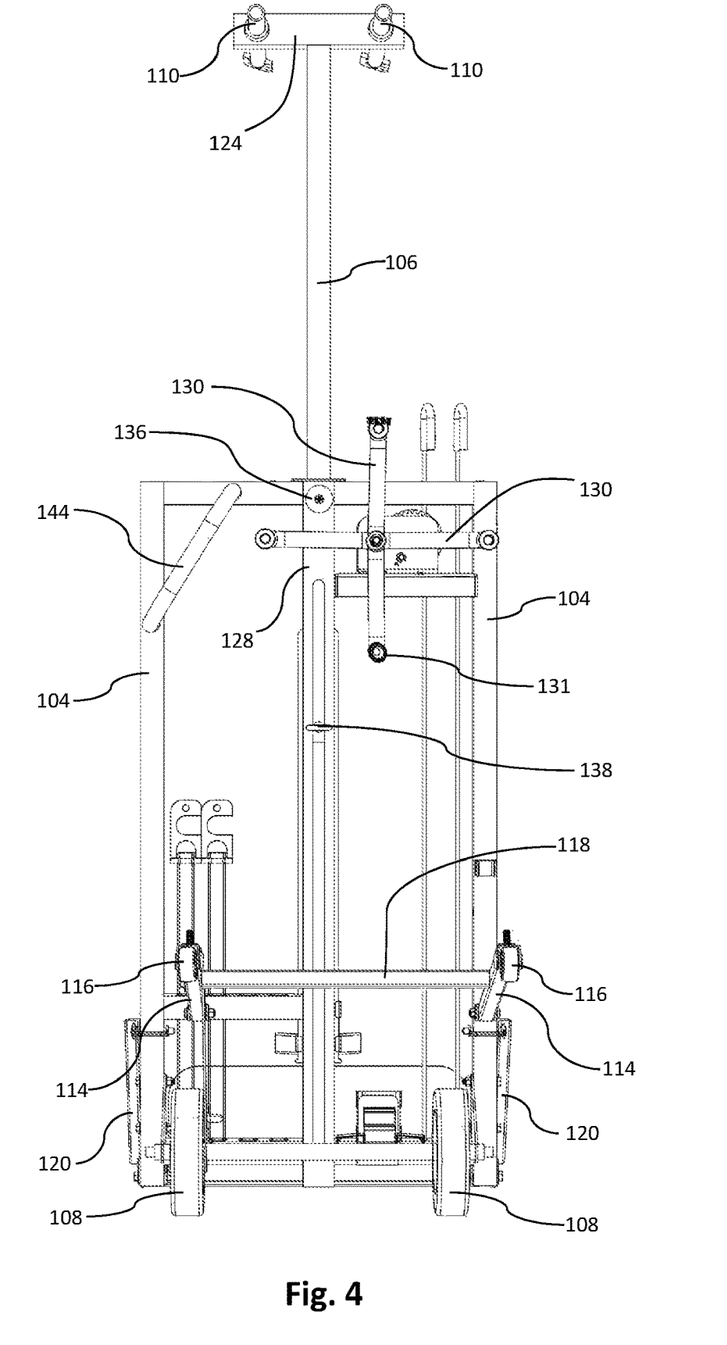
FIG. 4 is a rear elevation view of a hand truck.
Figure 5:
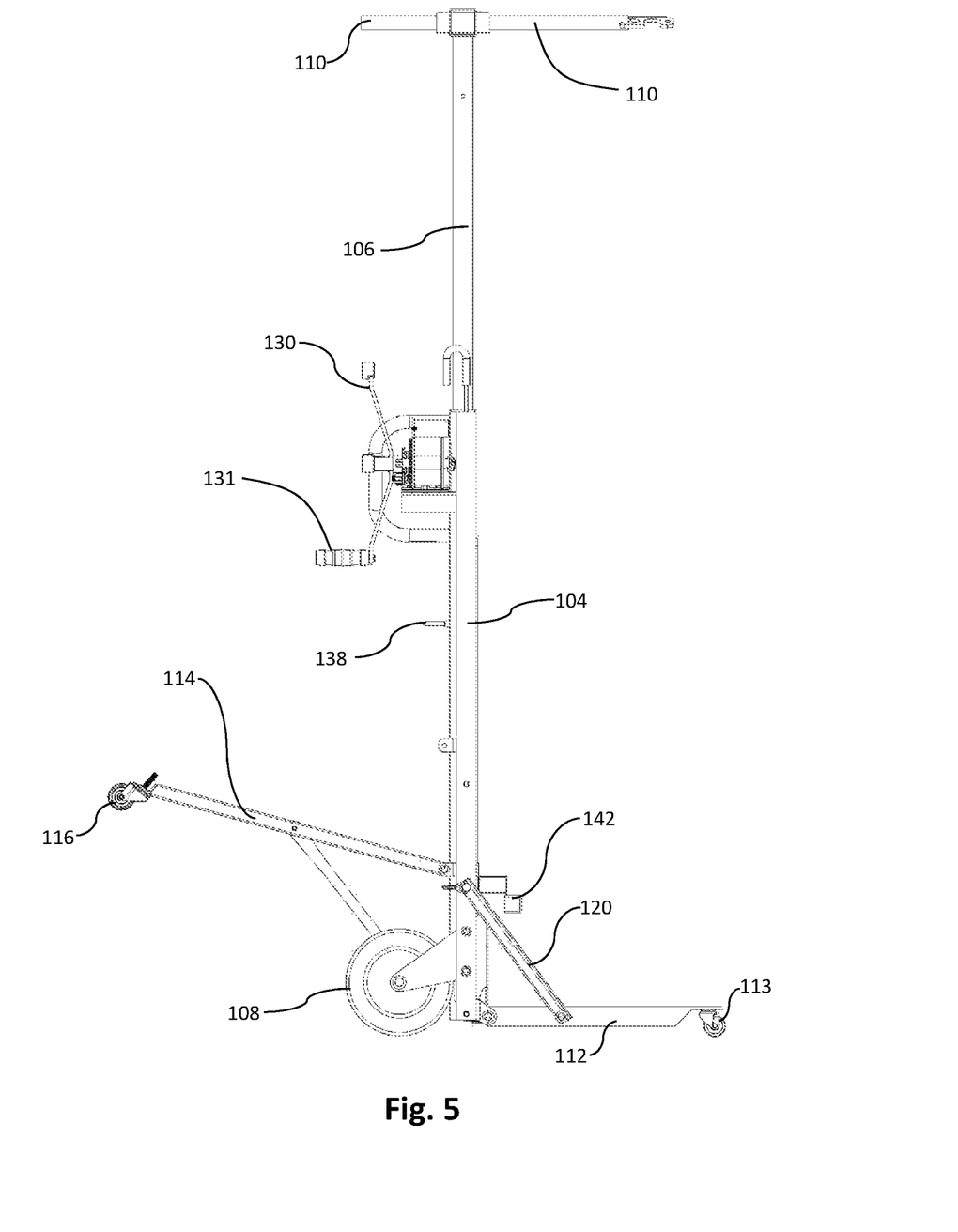
FIG. 5 is a side elevation view of a hand truck.
Figure 6:
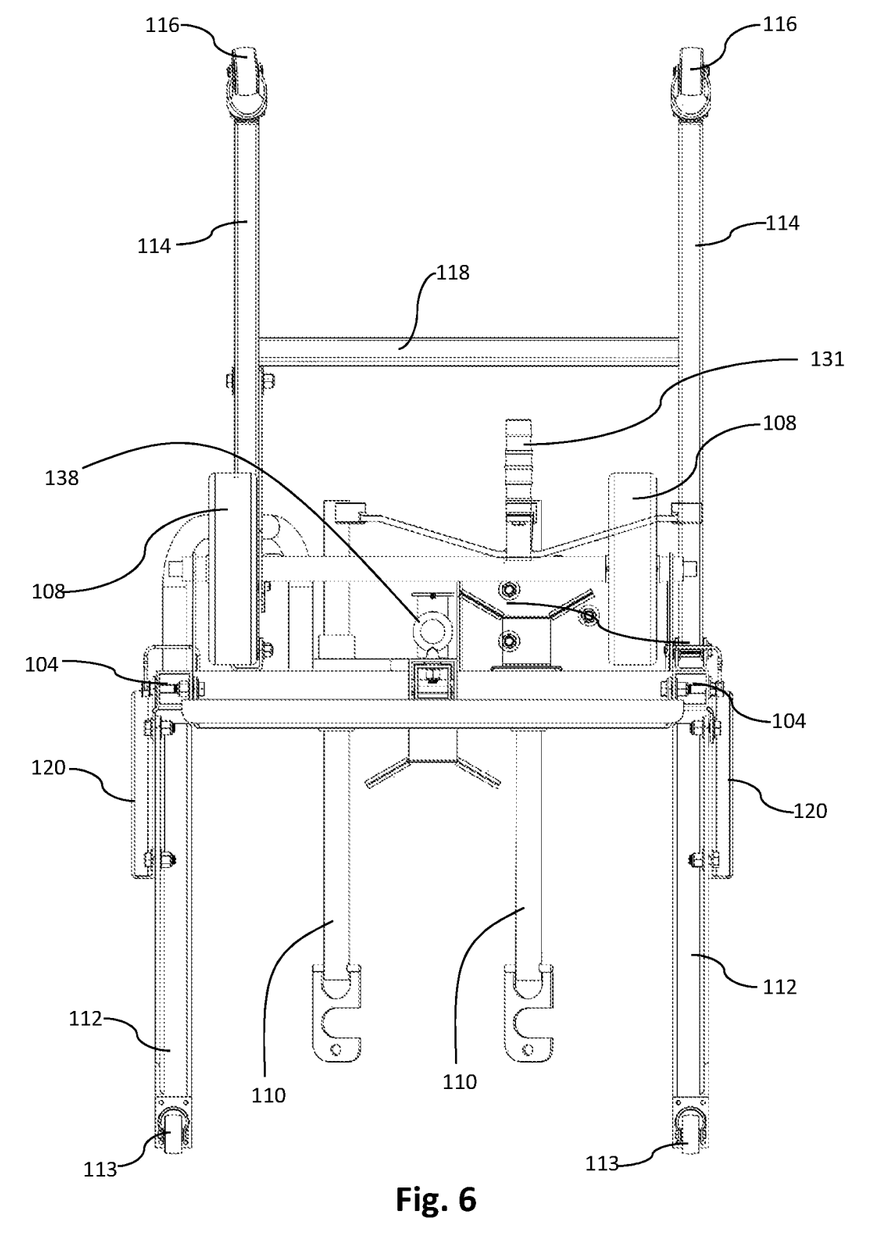
FIG. 6 is a bottom plan view of a hand truck.
Figure 7:
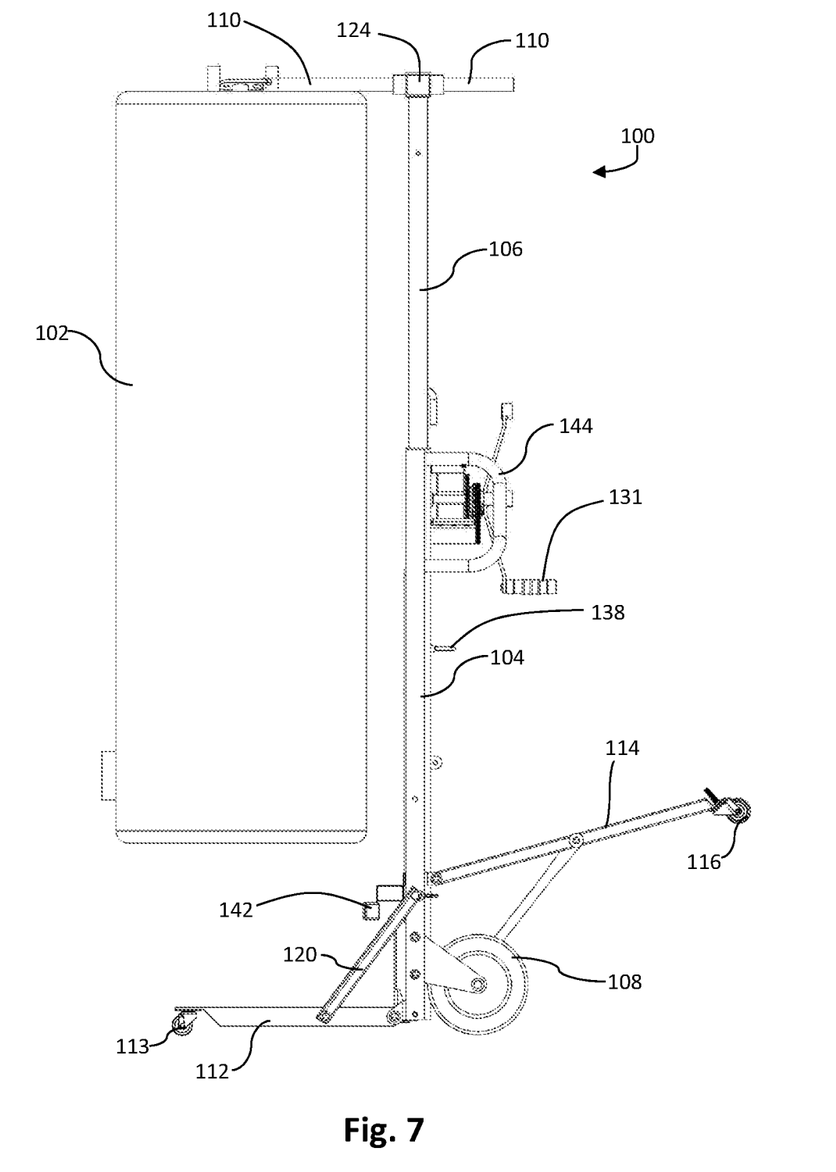
FIG. 7 is a side elevation view of a hand truck coupled to a water heater.
Figure 8:
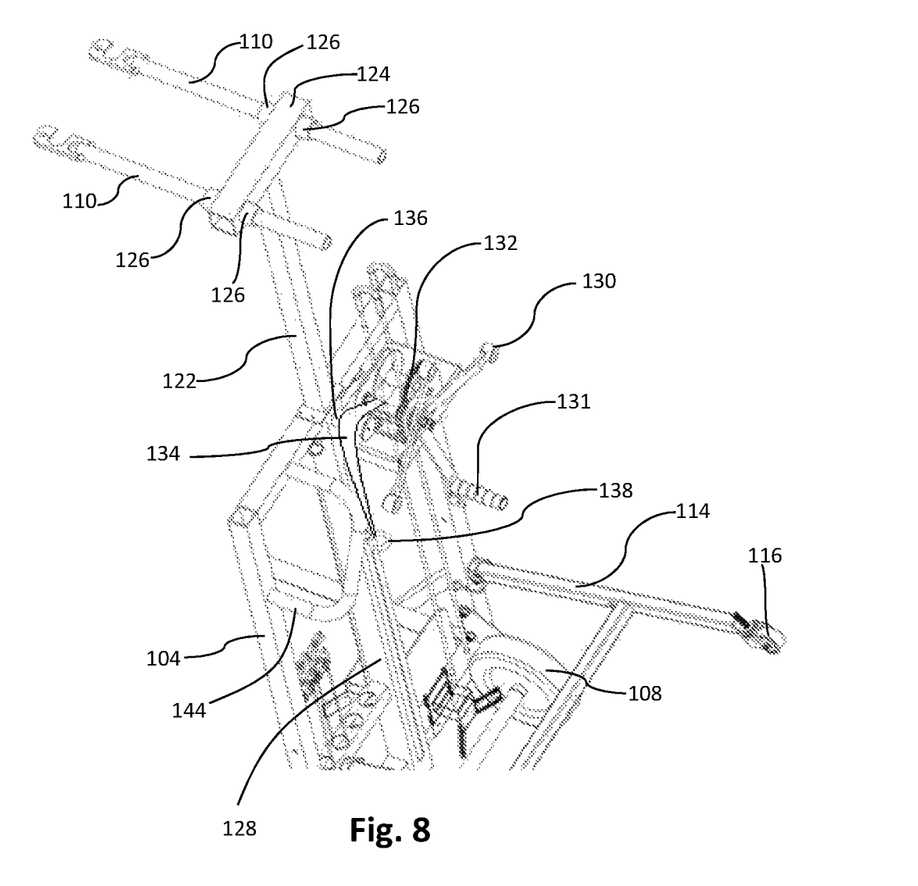
FIG. 8 is a perspective detailed view of a hand crank of a hand truck.

In one embodiment, the method for raising and lowering the extendable frame 106 comprises jacks (e.g., a scissor jack). In another embodiment, the method for raising and lowering the extendable frame 106 comprises a hand crank and strap system. In one example, the fixed frame 104 and extendable frame 106 are preferably telescopic: the fixed frame 104 receives the extendable frame 106 via center frame channel 128. As shown in FIG. 8, a hand crank 130 is coupled to the rear of the fixed frame 104, the hand crank 130 configured to rotate one or more gears 132. The hand crank 130 may have one or more arms, as illustrated, and a crank handle 131. The gears 132 are configured to wind and unwind a strap 134. One end of the strap 134 is placed over, and pivots on, a strap support rod 136. The strap support rod 136 is positioned at the center of the fixed frame 104 (e.g., on the center frame channel 128) and above a ring 138. The ring 138 is secured to the extendable frame 106 such that rotation of the hand crank 130 in a first direction winds the strap 134, causing the ring to be pulled upward (in a slot in the center frame 128), thereby vertically extending the extendable frame 106. When the hand crank 130 is rotated in a second direction, the strap 134 unwinds, allowing the ring 138 to follow gravity downward, which lowers the extendable frame 106. While a ring 138 is described, any type of protrusion or aperture that allows for connection of the strap 134 to the extendable frame 106 may be used. Accordingly, in one method of use, a user positions the lifting arms 110 over the water heater 102. The user then actuates the hand crank 130 to raise or lower the extendable frame 106 such that the lifting arms 110 engage the water heater 102. The hand crank 130 may comprise ratchet mechanisms or locking mechanisms known to those in the art, which would prohibit unintentional unwinding of the strap 134. Once at the appropriate height, the user secures the lifting arms 110 to the water heater 102 using threaded couplers or similar securing means at the distal end of the lifting arms 110. No modification to the water heater 102 is needed, as the lifting arms 110 may be coupled to the fittings on the top of the water heater 102. Once secured, the user may then actuate the hand crank 130 in a first direction so as to raise the extendable frame 106, thereby raising the water heater 102. As the water heater 102 is raised, the weight is supported on the front side using floor stabilizing arms 112. As will be appreciated, the floor stabilizing arms 112 may be replaced, or used in conjunction with, a standard hand truck base plate. A base plate allows the user to continue to use the hand truck 100 in the same manner as prior art hand trucks. A user may proceed to maneuver the hand truck 100 using the fulcrum wheels 108 and the front wheels 113, or may choose to tilt the hand truck 100 rearward such that the outrigger support beams 114 and accompanying wheels 116 engage the floor. In that position, the water heater 102 is fully-supported by the hand truck 100 and may be easily maneuvered to position.

As appreciated from the above example, the need to lift the water heater 102 for placement on a hand truck 100 is eliminated, as is the need to force a base plate underneath the water heater 102. Further, if the water heater 102 is in a position not level with the floor (e.g., on a pedestal), the hand truck 100 disclosed herein may still be easily used, which overcomes problems in the prior art.

While one method of raising and lowering the extendable frame comprises a hand crank 130 described above, other methods may be used, such as jacks, rack and pinion, and other methods. Any of the above methods may be achieved manually, or using power (e.g., onboard battery and motor). Referring to a jack system, it may be a scissor jack or any number of hydraulic jacks, which again, may be manually actuated or electrically powered. The jack system may be mounted to the upper portion of the fixed frame. In a non-limiting example, the jack system (e.g., scissor jack) is mounted on the handle, with the top portion of the jack being mounted to the extendable frame via a connecting frame. The connecting frame being connected to the extendable frame (e.g., welded), with the lifting arms being mounted thereon. However, it will be appreciated that different jacks may require a different configuration, but that any jack that moves an extendable frame so as to raise one or more lifting arms is specifically contemplated herein and will be appreciated by those in the art. Further, it will be noted that the jack system may be in any location on the fixed frame. In one embodiment, the jack system is mounted to the lower portion of the fixed frame, and proximate to a user, so as to create additional counterweight to the water heater. It will be appreciated that the fixed frame need not be tubular, but may be rectangular and have an open side that is center facing which allows the jack system to attach to the extendable frame. Additional weights may be coupled to the base of the so as to be a counterweight to the water heater and also aid in balancing on the fulcrum.

In one embodiment, the hand truck may further comprise a standing deck. The standing deck may aid a person in reaching the coupling ends of the lifting arms and may also act as an additional counterweight. In one embodiment, the standing deck is hinged so as to allow the deck to be moved into a vertical position parallel with, or received within, the fixed frame. This allows a user to use the hand truck in the standard manner, rotating it back onto the fulcrum. In an alternative embodiment, the standing deck remains perpendicular to the fixed frame, acting as a permanent counterbalance, and has one or more wheels for allowing the hand truck to easily roll without tilting.

In one embodiment, the extendable frame may additionally have a lifting platform that extends perpendicular to the fixed frame, on the distal side from the user, and at the bottom end of the extendable frame. As such, the lifting platform may be raised to the base height of the water heater (most water heaters are on an elevated stand). The lifting platform may then be forced under the water heater in much the same way that a standard dolly is used. However, a user may then also adjust and connect the lifting arms to the water heater. As such, when the hand crank 130 or jack system is actuated, both the lifting platform and the lifting arms raise, keeping the water heater secured therebetween for easier transport. In one embodiment, the lifting platform and lifting arms use separate jacks or cranks, providing the ability for the components attached thereto to act as a clamp or vice on the water heater.

In one embodiment, a method of moving a water heater comprises using a hand truck having a means for coupling to the top of the water heater and a means for raising and lowering the water heater. For example, a user would place the hand truck next to a water heater, raise the lifting arms to the appropriate height (if needed), connect the lifting arms to the water heater (e.g., threaded couplers), actuate the lifting jack or hand crank with strap which raises the water heater off of the ground (or stand), and then wheel the water heater to the desired location.

Figure 9:
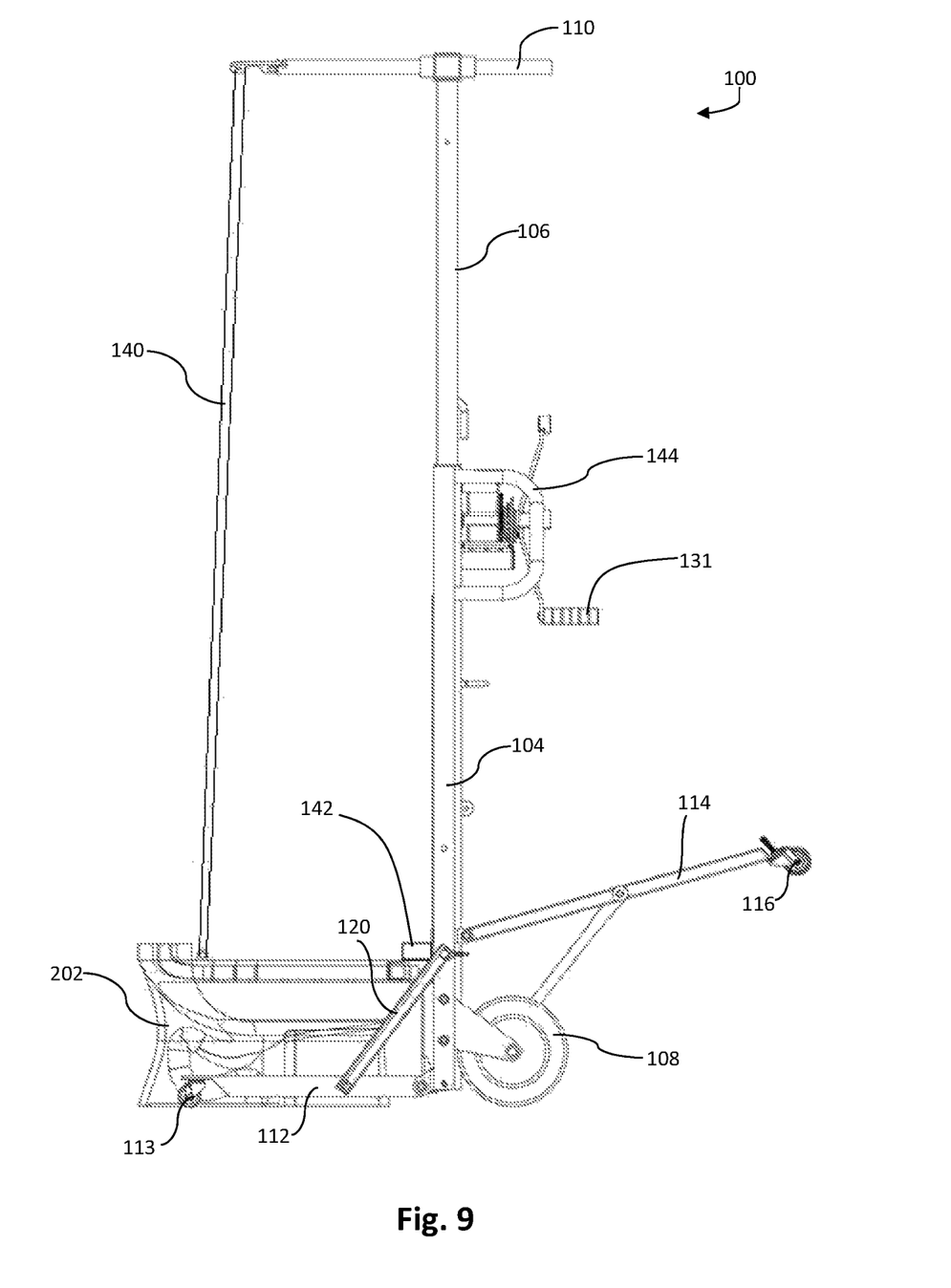
FIG. 9 is a side elevation view of a hand truck coupled to a toilet.
Figure 10:
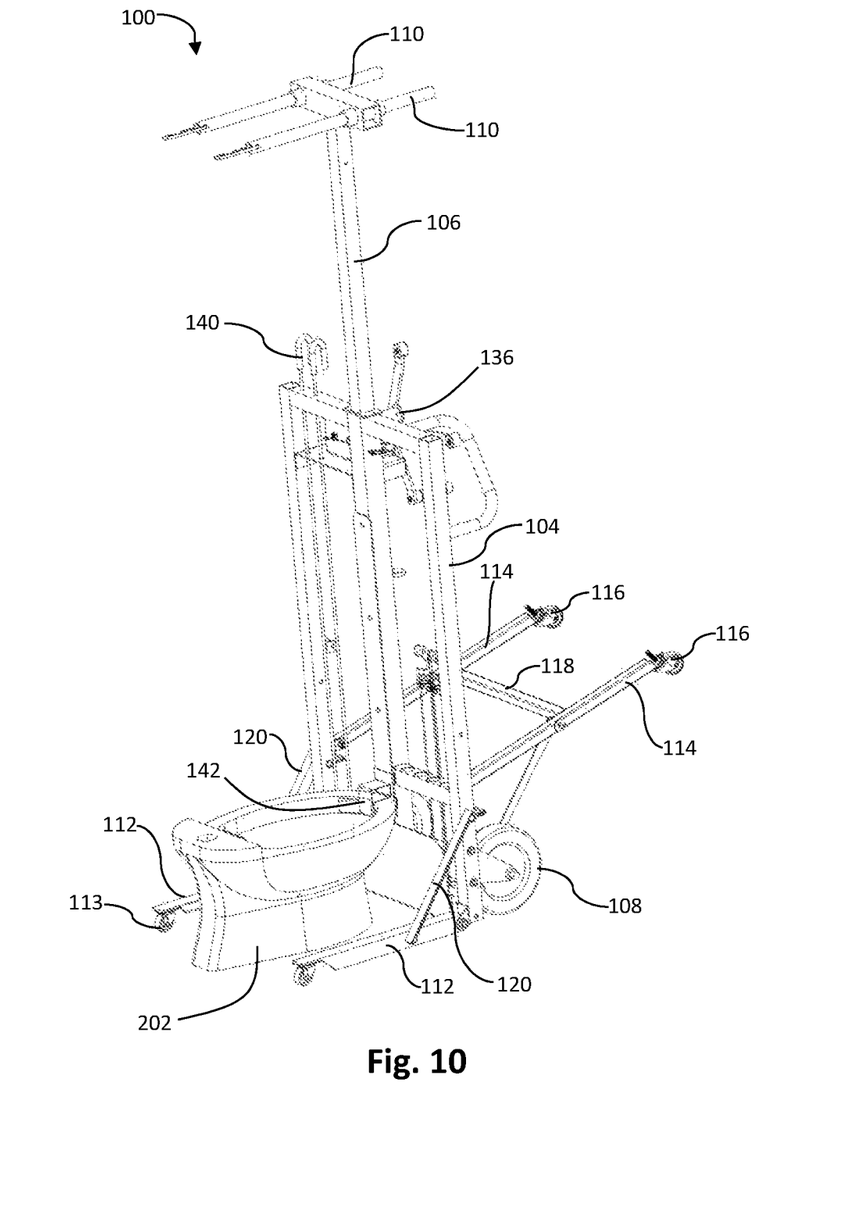
FIG. 10 is a perspective view of a hand truck coupled to a toilet.

In one embodiment, as shown in FIGS. 9-10, the hand truck 100 disclosed herein may also be used for moving a toilet 202. In such a configuration, extending rods 140 (which may be hollow tubes, solid rods, etc.) couple the toilet 202 to the lifting arms 110. In this manner, the same hand truck 100 may be used for both water heaters and toilets. For example, the extending rods 140 may be removed (such as by un-threading the rod from the lifting arms 110), such that the lifting arms 110 may now be coupled directly to a water heater, as previously explained herein. The extending rods 140 may be stored in the fixed frame 104, as shown in FIG. 10.

The extending rods 140 couple to the two bolt locations for securing the toilet seat to the toilet, allowing the toilet to be moved without modifications. A toilet securing mechanism 142 (e.g., a bracket and adjustment knob, or similar clamping means) may be used to prevent lateral movement or rotation of the toilet when in transit. As shown, the toilet securing mechanism 142 functions like a set-screw and may be used to essentially clamp the toilet in place. It will be appreciated that similar clamping mechanisms known in the art may also be used. The toilet securing mechanism 142 may be rotated (such as by using a hinged mechanism, for example) so as to not interfere with other loads being transported by the hand truck 100. Likewise, a user may detach the lifting arms so as to have an unobstructed traditional hand truck. As will be understood, the floor stabilizing arms 112 may be removable (e.g., removing relevant bolts), or may also be hinged, such that the stabilizing arms 112 may be removed, should a user need or desire. Likewise, a standard hand truck base plate 143 (see FIG. 2) may also be removably attachable and/or hingedly attached, allowing a user traditional use of the hand truck 100. Further, a handle 144 may be used to assist a user in moving the hand truck 100. The fixed frame 104 may also house one or more accessories, such as extension rods 140 or other items.

Therefore, as will be appreciated from the above description, the hand truck 100 for water heaters and toilets solves the current problems in the industry of lifting and transporting a water heater and a toilet. Further, the hand truck reduces the risk of injury when moving such objects. Further, while the disclosure above focused on water heaters and toilets, the invention need not be so limited. In other words, the lifting arms 110 may be coupled to various objects configured, whether such coupling means was installed by the manufacturer (such as the toilet and water heater), or added afterward by a user (such as by inserting screws or bolts) for the lifting arms 110 to engage.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein.

What is claimed is:
1. A hand truck, comprising:
a fixed frame comprising one or more fulcrum wheels on a rear side, at least one floor stabilizing arm coupled to and extending from a front side, at least one outrigger support beam extending from the rear of the fixed frame, the at least one outrigger support beam further comprising a wheel at a distal end; and
an extendable frame comprising a vertical beam, a horizontal beam coupled to the top of the vertical beam, and at least one lifting arm extending perpendicularly to the horizontal beam;

the extendable frame vertically adjustable in relation to the fixed frame;

the fixed frame further comprising a hand crank coupled to the rear of the fixed frame, the hand crank configured to rotate one or more gears, the gears configured to wind and unwind a strap, the strap pivoting on a strap support rod, wherein the strap support rod is positioned at the center of the fixed frame and above a ring, the ring secured to the extendable frame, such that rotation of the hand crank in a first direction winds the strap causing the ring to be pulled upward, thereby vertically extending the extendable frame, and wherein when the hand crank is rotated in a second direction, the strap unwinds, allowing the ring to follow gravity downward, which lowers the extendable frame.

2. The hand truck of claim 1, wherein the one or more lifting arms are horizontally adjustable and are configured, at a distal end, to couple to a water heater.

3. The hand truck of claim 2, wherein the one or more lifting arms are configured to couple to a toilet.

4. The hand truck of claim 1, wherein the at least one floor stabilizing bar is removably attachable.

5. A method of using the hand truck of claim 1 for moving a water heater, the method comprising:
positioning the lifting arms over the water heater;
actuating the hand crank to raise or lower the extendable frame such that the lifting arms engage the water heater;
securing the lifting arms to the water heater;
actuating the hand crank in a first direction so as to raise the extendable frame, thereby raising the water heater; and
transporting the water heater to the desired location.

6. The method of claim 5, wherein the fixed frame is pivoted rearwardly such that the outrigger support beams engage the ground, allowing the hand truck to fully-support the water heater.

7. A hand truck, comprising:
a fixed frame comprising:
one or more fulcrum wheels on a rear side;
at least one floor stabilizing arm coupled to and extending from a front side; and
at least one outrigger support beam extending from the rear of the fixed frame, the at least one outrigger support beam non-parallel to the fixed frame and further comprising a wheel at a distal end;
an extendable frame comprising:
a vertical beam;
a horizontal beam coupled to the top of the vertical beam; and
a pair of horizontally-adjustable lifting arms extending perpendicularly from the horizontal beam to engage the fittings on the top of a water heater;
wherein the extendable frame is vertically adjustable in relation to the fixed frame.

* * * * *